(12) United States Patent
Huang et al.

(10) Patent No.: US 10,273,733 B2
(45) Date of Patent: Apr. 30, 2019

(54) ADJUSTABLE GLASS GRIPPING DEVICE FOR A VEHICLE WINDOW REGULATOR

(71) Applicants: HSIN CHONG MACHINERY WORKS CO. LTD., New Taipei (TW); FUZHOU MINGFANG AUTOMOBILE PARTS INDUSTRY CO., LTD., Fuzhou (CN); Francisco Javier Martinez Moral, Madrid (ES)

(72) Inventors: Chi-Ming Huang, New Taipei (TW); Kuang-Yu Chiang, New Taipei (TW)

(73) Assignees: HSIN CHONG MACHINERY WORKS CO. LTD., New Taipei (TW); FUZHOU MINGFANG AUTOMOBILE PARTS INDUSTRY CO., LTD., Fuzhou (CN); Francisco Javier Martinez Moral, Madrid (ES)

( * ) Notice: Subject to any disclaimer, the term of this patent is extended or adjusted under 35 U.S.C. 154(b) by 138 days.

(21) Appl. No.: 15/594,839

(22) Filed: May 15, 2017

(65) Prior Publication Data

US 2018/0326820 A1    Nov. 15, 2018

(51) Int. Cl.
| | | |
|---|---|---|
| *E05F 11/38* | (2006.01) | |
| *B60J 1/17* | (2006.01) | |
| *E05F 11/48* | (2006.01) | |

(52) U.S. Cl.
CPC .............. *E05F 11/385* (2013.01); *B60J 1/17* (2013.01); *E05F 11/488* (2013.01); *E05F 11/38* (2013.01); *E05F 2011/387* (2013.01); *E05Y 2900/55* (2013.01)

(58) Field of Classification Search
CPC . E05F 11/385; E05F 11/382; E05F 2011/387; E05Y 2201/64; E05Y 2600/56; B60J 1/17
See application file for complete search history.

(56) References Cited

U.S. PATENT DOCUMENTS

| | | | | |
|---|---|---|---|---|
| 4,910,917 A * | 3/1990 | Brauer | ....................... | B60J 1/17 49/348 |
| 5,622,005 A * | 4/1997 | Ochenski | ................... | B60J 1/17 49/375 |
| 5,729,930 A * | 3/1998 | Schust | ........................ | B60J 1/17 49/372 |
| 5,809,695 A * | 9/1998 | Strickland | ............. | E05F 11/488 49/352 |
| 6,453,617 B1 * | 9/2002 | Klippert | ................ | E05F 11/385 49/375 |

(Continued)

FOREIGN PATENT DOCUMENTS

| | | |
|---|---|---|
| CN | 101260769 B | 5/2011 |
| TW | M432682 U | 7/2012 |

OTHER PUBLICATIONS

Office Action dated Oct. 5, 2017 of the corresponding Taiwan patent application No. 106103154.

*Primary Examiner* — Justin B Rephann
(74) *Attorney, Agent, or Firm* — Chun-Ming Shih; HDLS IPR Services (57) ABSTRACT

A window glass gripping device which is assembled on a rail with a linking element includes: a glass gripper, slidably connected on the rail; a limiter, secured on the linking element; and an adjusting bolt, screwed to the glass gripper, having a limited portion. The limiter is assembled to correspond to the limited portion for limiting a position of the adjusting bolt.

7 Claims, 7 Drawing Sheets

(56) References Cited

U.S. PATENT DOCUMENTS

| | | | | |
|---|---|---|---|---|
| 6,519,898 B2 * | 2/2003 | Tatsumi | E05F 11/385 | 49/375 |
| 6,598,345 B1 * | 7/2003 | Arimoto | E05F 11/385 | 49/352 |
| 7,802,401 B2 * | 9/2010 | Wild | E05F 11/382 | 49/352 |
| 8,388,044 B2 * | 3/2013 | Saito | E05F 11/385 | 296/146.2 |
| 2002/0017061 A1 * | 2/2002 | Nicolai | E05F 11/385 | 49/375 |
| 2004/0107645 A1 * | 6/2004 | Galliani | B60J 1/17 | 49/375 |
| 2004/0154227 A1 * | 8/2004 | Yoshimura | E05F 11/385 | 49/352 |
| 2005/0268558 A1 * | 12/2005 | Cardine | E05F 11/385 | 49/349 |
| 2006/0130407 A1 * | 6/2006 | Castellon | E05F 11/385 | 49/375 |
| 2009/0007494 A1 * | 1/2009 | Pavlovic | E05F 11/382 | 49/349 |
| 2009/0199483 A1 * | 8/2009 | Golub | B60J 1/17 | 49/348 |
| 2010/0043297 A1 * | 2/2010 | Barr | E05F 11/385 | 49/375 |
| 2010/0325962 A1 * | 12/2010 | Hampel | E05F 11/382 | 49/157 |
| 2011/0109125 A1 * | 5/2011 | Kreher | E05F 11/385 | 296/201 |
| 2011/0225888 A1 * | 9/2011 | Aschmutat | E05F 11/382 | 49/352 |
| 2012/0247020 A1 * | 10/2012 | Trevarrow | E05F 11/385 | 49/348 |
| 2014/0086668 A1 * | 3/2014 | Lee | E06B 3/5481 | 403/187 |
| 2016/0208535 A1 | 7/2016 | Tanaka et al. | | |

* cited by examiner

ADJUSTABLE GLASS GRIPPING DEVICE FOR A VEHICLE WINDOW REGULATOR

BACKGROUND OF THE INVENTION

1. Technical Field

The invention relates to vehicle windows, particularly to power window regulators.

2. Related Art

Power windows of a vehicle must have a window regulator to raise or lower the windows. For power windows, a frequent problem is that the window cannot completely join with the door frame when the window has been raised to the top. There are many possible reasons for this problem: the rail could be inaccurately oblique or the window could not fully correspond to the door in shape.

However, once such a situation occurs, conventional glass grippers are not provided with a fine-tuning mechanism, requiring the window to be released by the glass gripper before correcting the window to an exact position or angle and fastening the window. Obviously, this is very laborious and time-consuming.

SUMMARY OF THE INVENTION

An object of the invention is to provide an adjustable glass gripping device for a vehicle window regulator, which allows a window glass to be fine-tuned only by rotating a bolt. It is very time and labor saving.

To accomplish the above object, the invention provides an adjustable glass gripping device for a vehicle window regulator, which is assembled on a rail with a linking element, includes: a glass gripper, slidably attached on the rail; a limiter, secured on the linking element; and an adjusting bolt, screwed to the glass gripper, having a limited portion. The limiter is assembled to create the limited portion for limiting the position of the adjusting bolt.

DETAILED DESCRIPTION OF THE INVENTION

Figure 1:
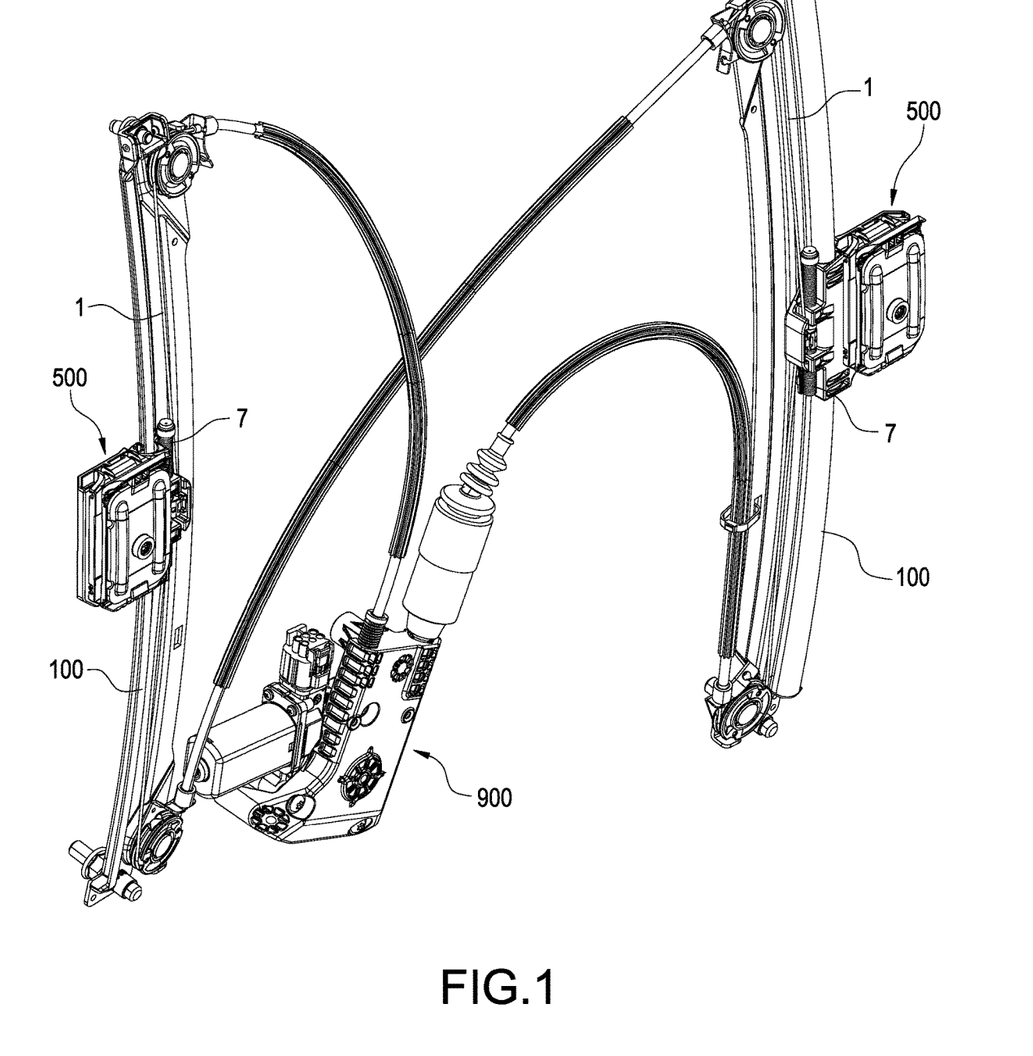
FIG. 1 is a perspective view of a window regulator with the invention.

The invention provides an adjustable glass gripping device for a vehicle window regulator. As shown in FIG. 1, the window regulator includes a rail 100, glass gripping devices 500 and a driving device 900. A glass window (not shown) is held by the glass gripping devices 500. The driving device 900 drives the glass gripping devices 500 to elevate or lower on the rail 100 through a linking element 1. The linking elements 1 may be cables as shown in the figure. The cables parallel the rail 100 and connect the driving device 900 so that the driving device 900 can move the cables and the glass gripping devices 500 along the rail 100. As a result, the glass window held by the glass gripping devices 500 can be raised or lowered.

Figure 2:
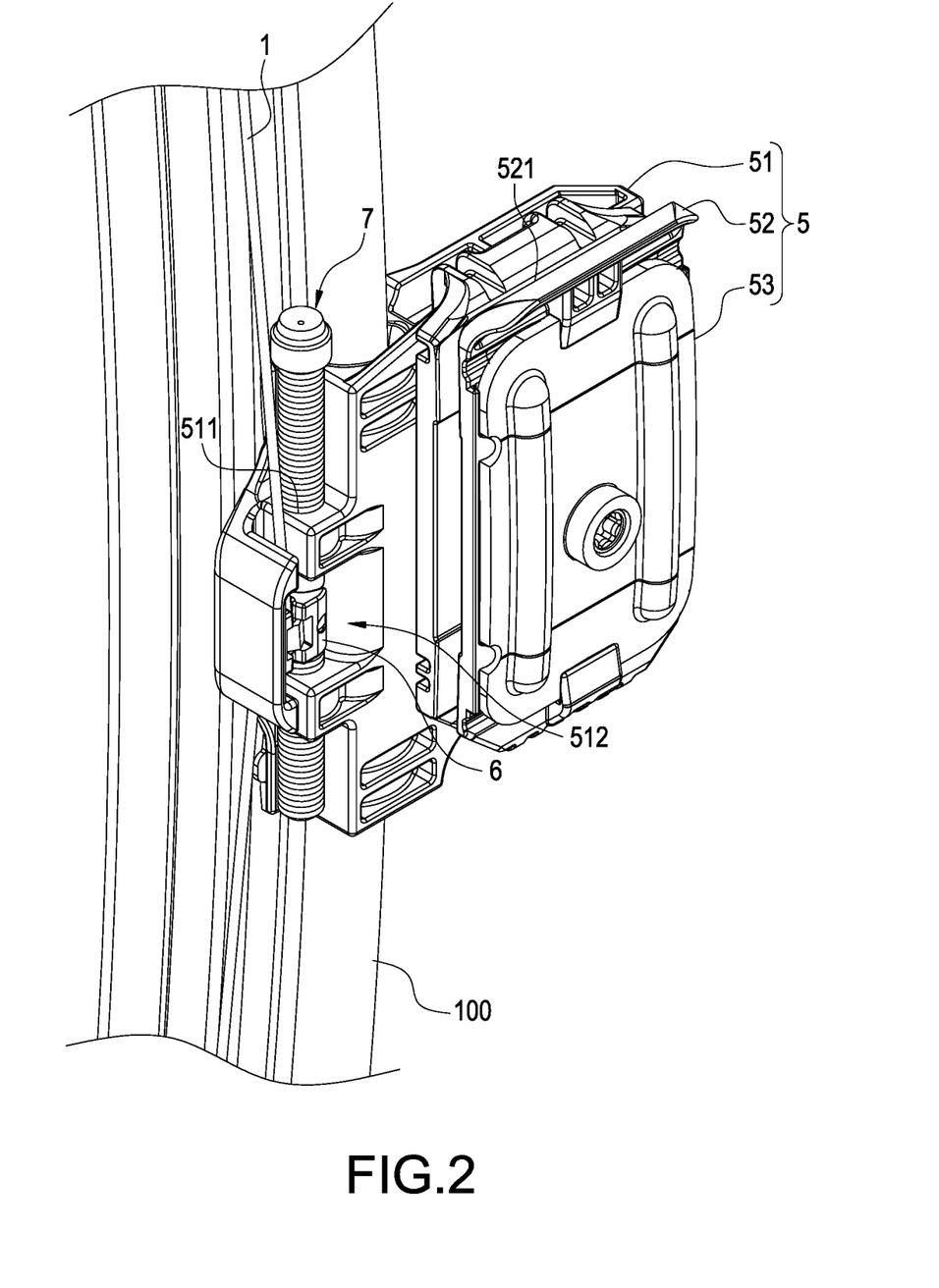
FIG. 2 is a partially enlarged view of FIG. 1.
Figure 3:
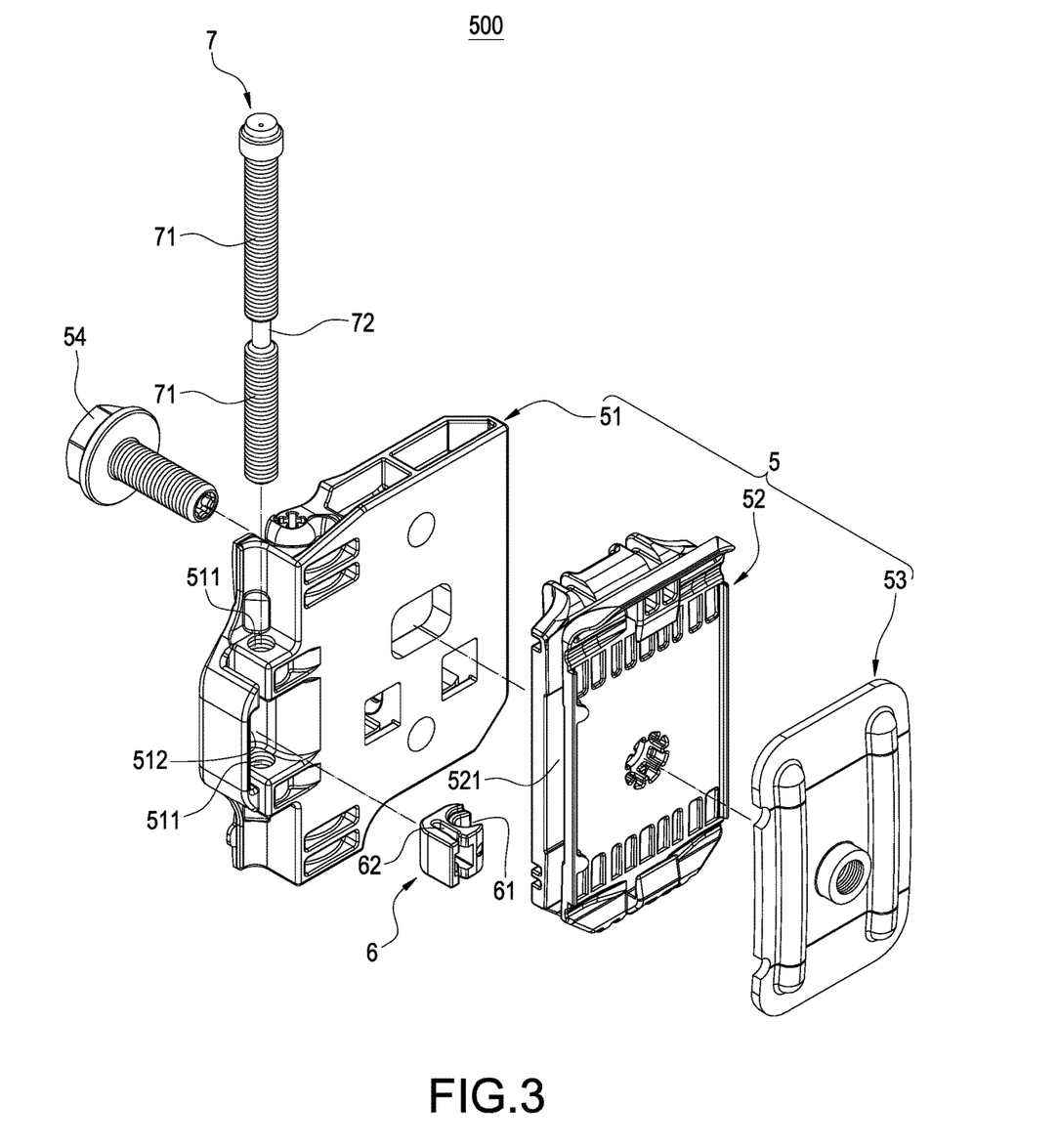
FIG. 3 is an exploded view of the invention.
Figure 4:
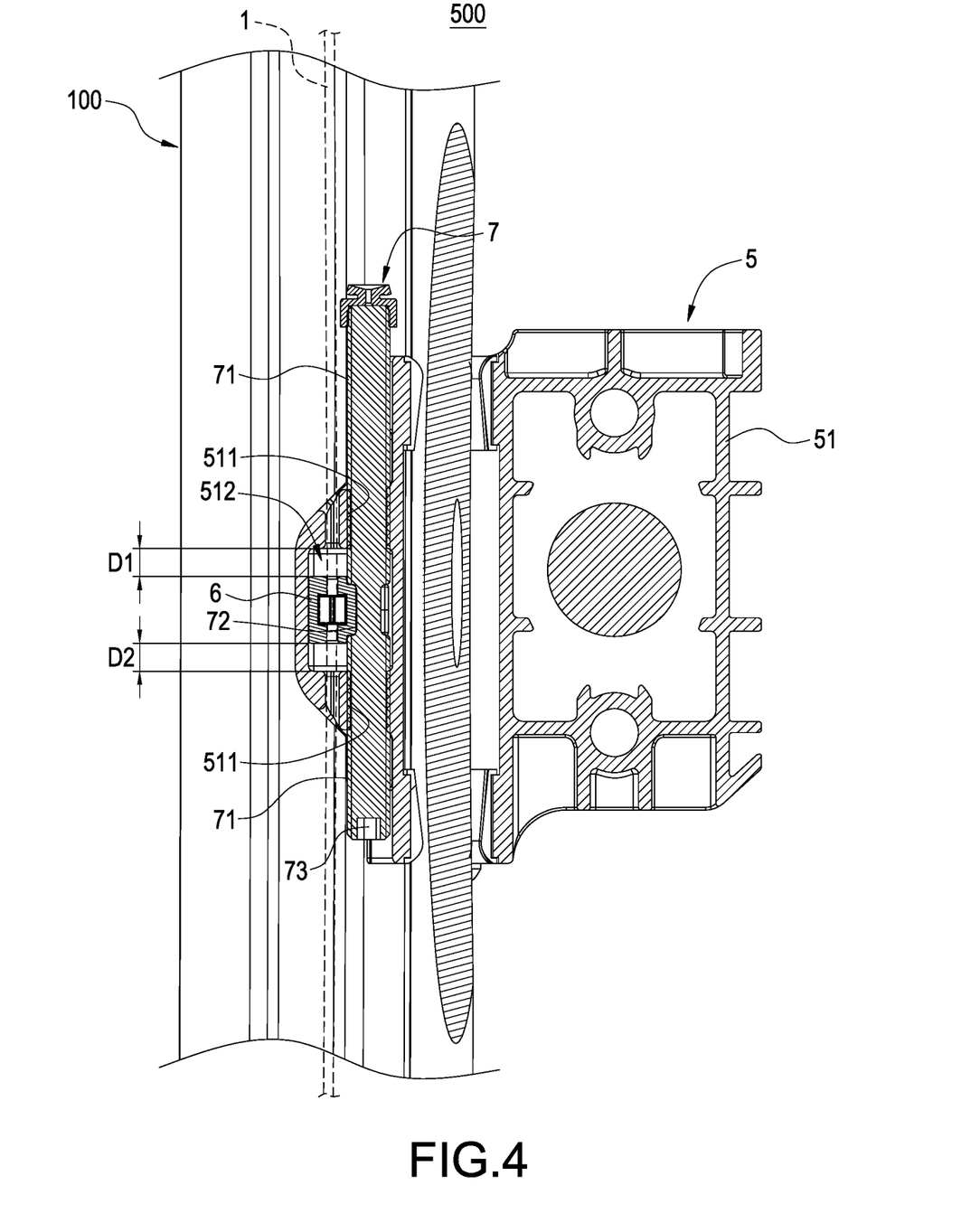
FIG. 4 is a cross-sectional view of the invention assembled on the rail.

As shown in FIGS. 2-4, the glass gripping device 500 includes a glass gripper 5, a limiter 6 and an adjusting bolt 7.

The glass gripper 5 is slidably connected on the rail 100 and no specific structure is required. As an example, the embodiment includes a base 51, and preferably further includes a fastener 52 and a reinforcement element 53.

The fastener 52 has a gripping slot 521 for gripping a window glass and two opposite sides for being separately attached by the base 51 and the reinforcement element 53. Preferably, a fixer 54 is used to secure the fastener 52 between the base 51 and the reinforcement element 53.

The base 51 has two screwing portions 511. In this embodiment, the base 51 is formed with two walls and each of the walls is provided with one screwing portion 511. A receiving room 512 is formed between the two screwing portions 511 of the base 51. The receiving room 512 is defined by inner walls of the base 51, and the abovementioned walls are two of these inner walls.

The limiter 6 is secured on the linking element 1 and is located at the base 51. As an example, in this embodiment, the limiter 6 is located in the receiving room 512 so as to limit the limiter 6 with the inner walls. In detail, the limiter 6 has a pivoting portion 61 and a fixing portion 62 for fastening the linking element 1. The fixing portion 62 may be a holding slot to fasten the linking element 1. The limiter 6 can be moved along with the linking element 1.

The adjusting bolt 7 has two threaded portions 71 and a limited portion 72 therebetween. The limited portion 72 may be any non-threaded shape. In the shown embodiment, the limited portion 72 is a smooth rod whose diameter is less than those of the two threaded portions 71.

The two threaded portions 71 are separately screwed into the screwing portions 511 of the base 51 so as to make the limited portion 72 located in the receiving room 512 or between the two screwing portions 511. Also, the pivoting portion 61 of the limiter 6 pivots on the limited portion 72 so as to make the adjusting bolt 7 limited by the limited portion 72 rotate in the pivoting portion 61. As shown in FIGS. 3 and 4, the limiter 6 is equivalently attached between the two threaded portions 71 for position limiting.

As a result, the limiter 6 can be moved along with the linking element 1, and the limiter 6 can lead the glass gripper 5 to move together through the adjusting bolt 7. Finally, the glass gripper 5 can move along the rail 100.

The glass gripper has a limited portion. The limiter is assembled to correspond to the limited portion for limiting a position of the adjusting bolt.

Figure 5:
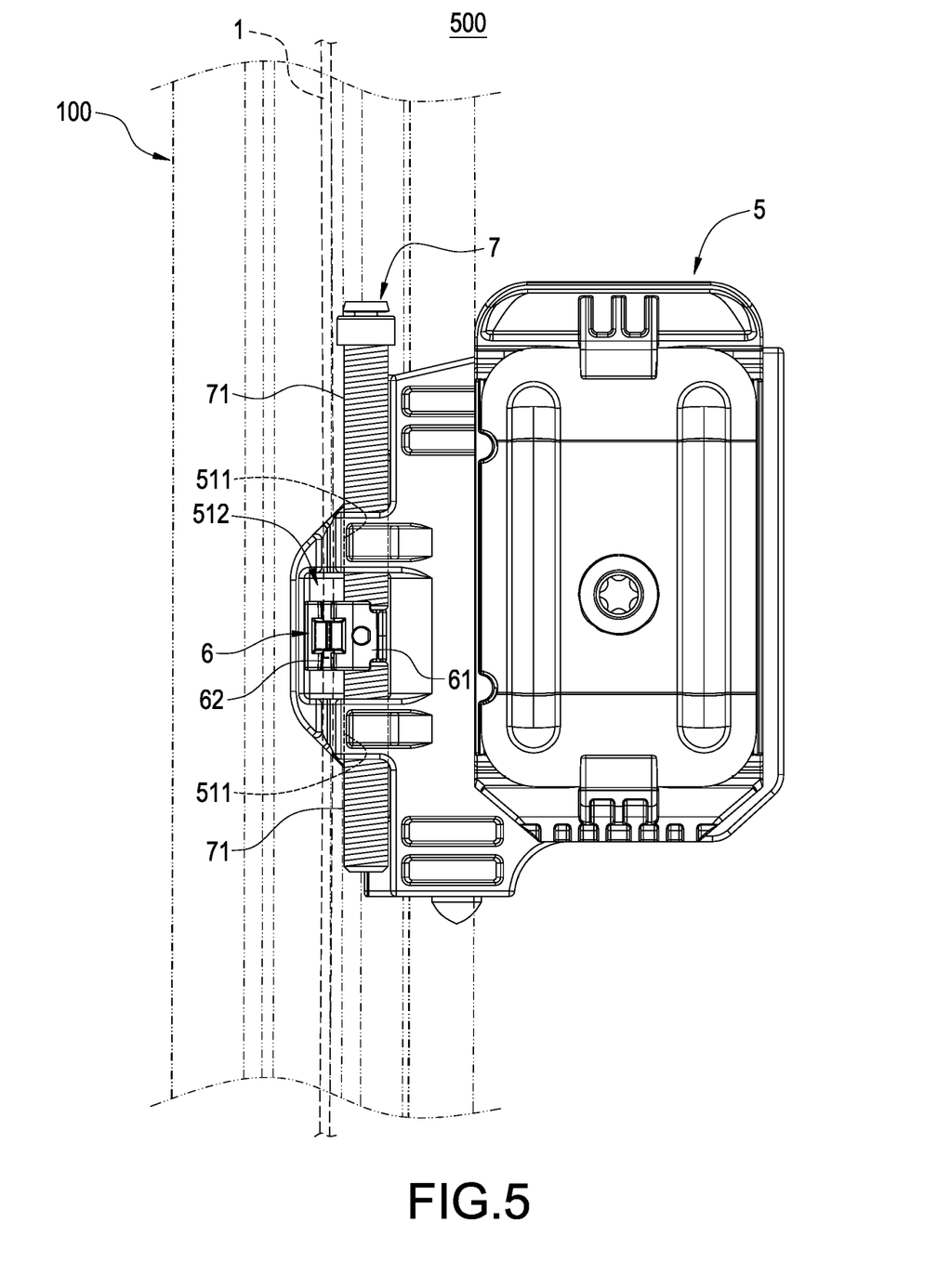
FIG. 5 is a plan view of the invention before adjusting.

As shown in FIGS. 4 and 5, to allow the limiter 6 to make to-and-fro adjustments, the limiter 6 is not in contact with the inner walls of the receiving room 512 in its to-and-fro direction. In detail, two distances D1, D2 are separately kept between two opposite ends of the limiter 6 and their respective adjacent inner walls, so that the limiter 6 can be moved to touch an inner wall in a direction or the other inner wall in an opposite direction. In other words, the distances D1, D2 are the maximum adjustable length of the limiter 6.

Figure 6:
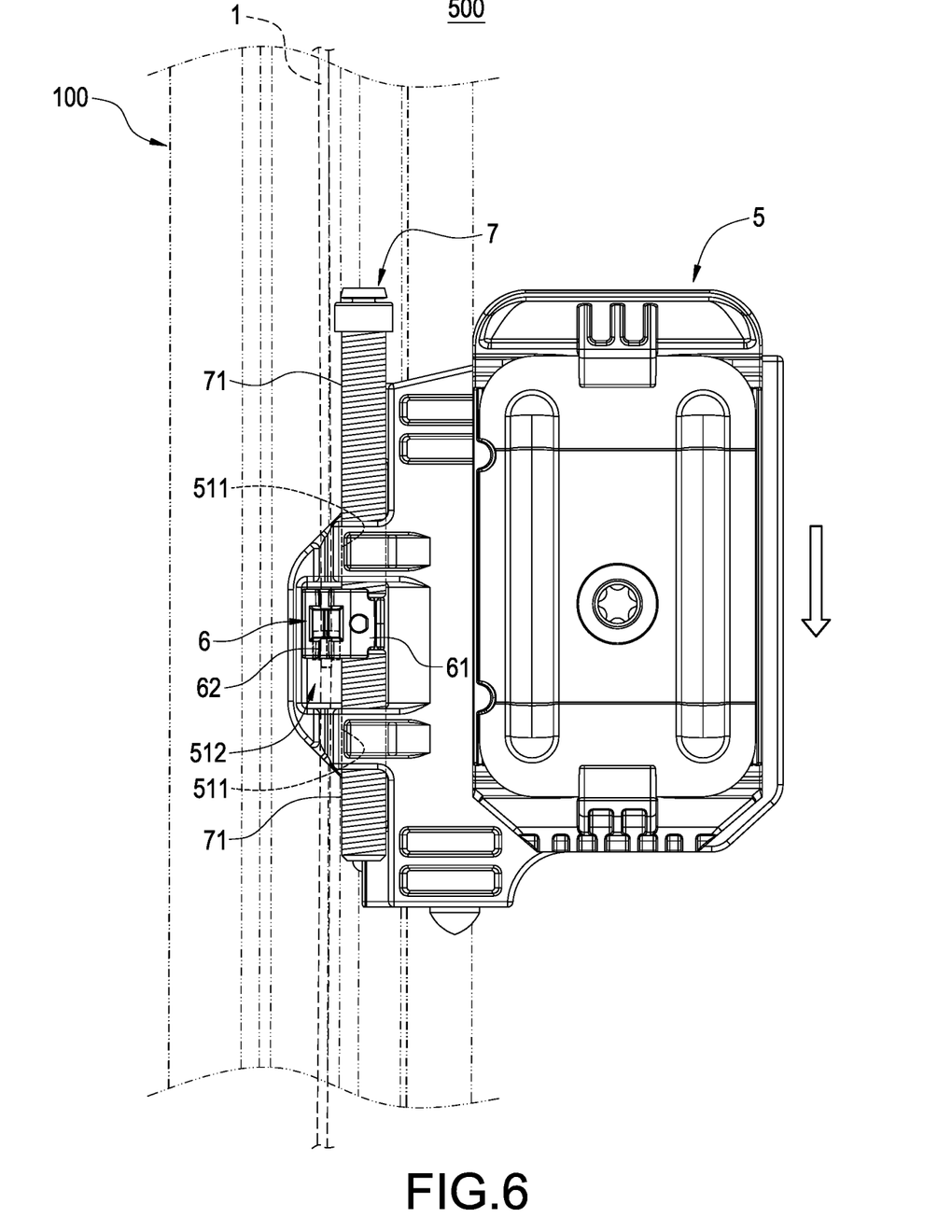
FIG. 6 is a plan view of the invention after adjusting toward a direction.

As shown in FIG. 6, when a window glass in held by the glass gripper 5 and the window glass is oblique, the glass gripper 5 can be moved downward along the rail 100 (the arrow in FIG. 6) by rotating the adjusting bolt 7 (the adjusting bolt 7 cannot move in all directions except its axial direction because it is limited). That is, the distance D1 (FIG.

4) is shortened so that an unintended high end of the window glass can be lowered. The window glass can be continuously adjusted until one end of the limiter 6 is stopped by an inner wall.

Figure 7:
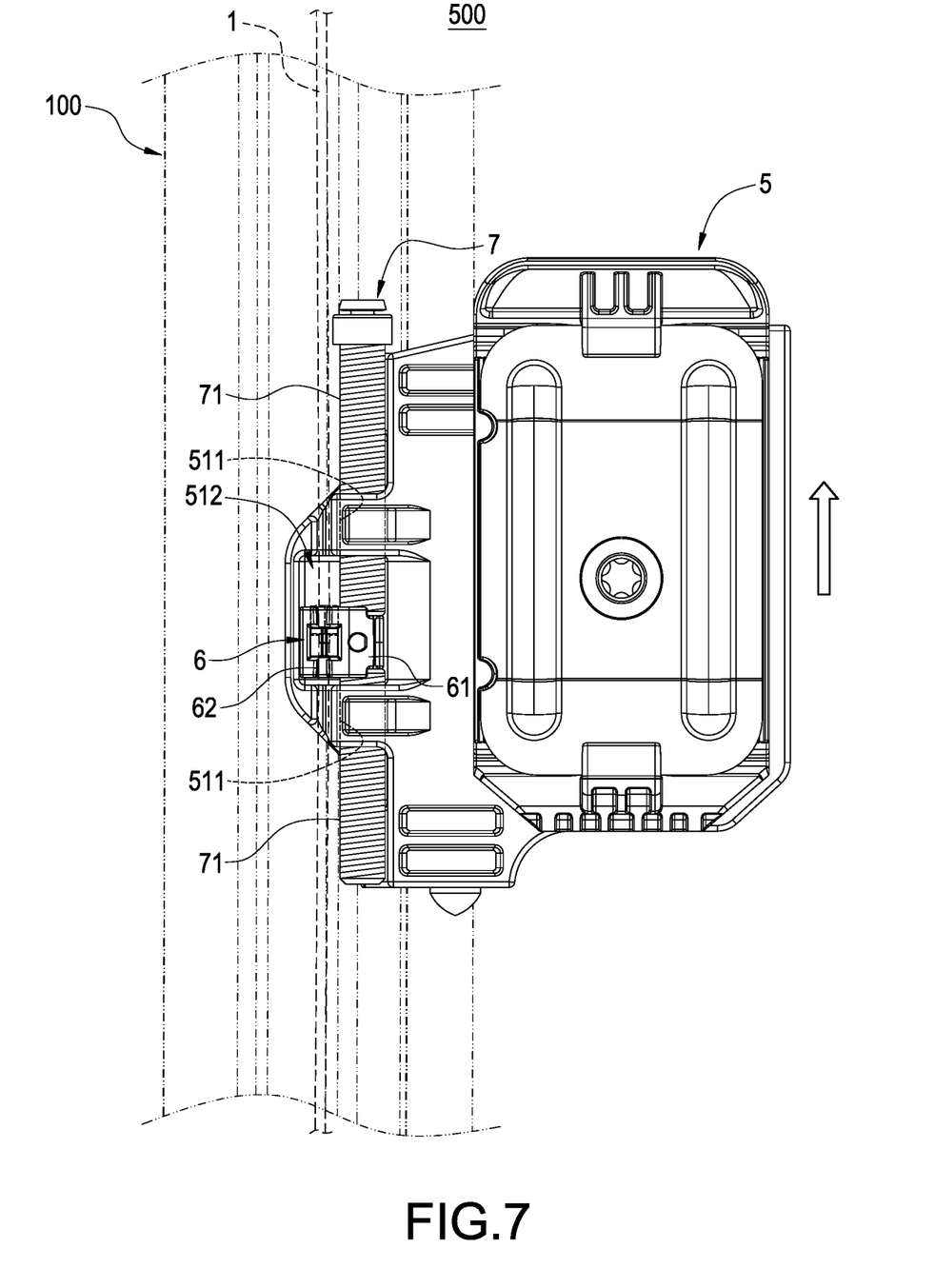
FIG. 7 is a plan view of the invention after adjusting toward the other direction.

As shown in FIG. 7, when one side of the window glass is too low, the glass gripper 5 can be moved upward along the rail 100 (the arrow in FIG. 7) by reversely rotating the adjusting bolt 7. That is, the distance D2 (FIG. 4) is shortened so that an unintended low end of the window glass can be raised. The window glass can be continuously adjusted until the other end of the limiter 6 is stopped by the other inner wall.

As shown in FIG. 4, the adjusting bolt 7 may have an adjusting portion 73 which is any structure allowing the adjusting bolt 7 to rotate. As an example, in the shown embodiment, the adjusting portion 73 is an inner hexagonal hole, so that the adjusting bolt 7 can be rotated by a hexagonal wrench.

Please refer to FIG. 1, the glass gripping device 500 of the invention can be installed in a car door to control a window glass to raise or lower and allow the window glass to be fine-tuned for completely matching a window frame if it is oblique.

In sum, in the invention, the adjusting bolt 7 is screwed into the glass gripper 5, the glass gripper 7 is limited by the limiter 6 and the limiter 6 is driven by the linking element 1 and limited in the receiving room 512 of the glass gripper 5. As a result, every glass gripping device 500 can be independently adjusted, and the window glass can be adjusted by rotating the adjusting bolt 7. It is very time and labor saving.

The invention can be used in any vehicle door, and especially those without a window frame. Because a window glass in such a vehicle door cannot be positioned by a window frame rather than a body, incomplete matches tend to occur. By the invention, complete match between the window glass and the body can be guaranteed.

It will be appreciated by persons skilled in the art that the above embodiment has been described by way of example only and not in any limitative sense, and that various alterations and modifications are possible without departure from the scope of the invention as defined by the appended claims.

What is claimed is:

1. An adjustable glass gripping device for a vehicle window regulator, which is assembled on a rail with a linking element, comprising:
   a glass gripper, slidably connected on the rail;
   a limiter, secured on the linking element; and
   an adjusting bolt, screwed to the glass gripper, having a limited portion, wherein the limiter is assembled to correspond to the limited portion for limiting a position of the adjusting bolt,
   wherein the glass gripper comprises a base slidably connected to the rail, the base has two screwing portions, the adjusting bolt is screwed to the screwing portions, and the limited portion is located between the two screwing portions;
   wherein the adjusting bolt has two threaded portions, the limited portion is a smooth rod between the two threaded portions, the two threaded portions of the adjusting bolt are separately screwed to the two screwing portions, and the limiter is pivoted on the smooth rod.

2. The adjustable glass gripping device of claim 1, wherein a receiving room is formed between the two screwing portions of the base, and the limiter is received in the receiving room and is pivoted onto the limited portion.

3. The adjustable glass gripping device of claim 1, wherein the glass gripper further comprises a fastener attached on the base.

4. The adjustable glass gripping device of claim 3, wherein the glass gripper further comprises a reinforcement element, the base and the reinforcement portion are separately fastened onto two opposite sides of the fastener.

5. The adjustable glass gripping device of claim 1, wherein the adjusting bolt has an adjusting portion which is an inner hexagonal hole.

6. The adjustable glass gripping device of claim 1, wherein the limiter is pivoted onto the limited portion.

7. The adjustable glass gripping device of claim 1, wherein the limiter is limited by the linking element to follow the linking element to move.

* * * * *